July 17, 1962  H. M. ROBINSON  3,045,166
MOTOR-BRAKE UNIT
Filed Oct. 2, 1959  3 Sheets-Sheet 1

INVENTOR.
HORACE M. ROBINSON
BY
Flam and Flam
ATTORNEYS.

July 17, 1962     H. M. ROBINSON     3,045,166
MOTOR-BRAKE UNIT

Filed Oct. 2, 1959     3 Sheets-Sheet 2

INVENTOR.
HORACE M. ROBINSON
BY Flam and Flam
ATTORNEYS.

July 17, 1962 H. M. ROBINSON 3,045,166
MOTOR-BRAKE UNIT
Filed Oct. 2, 1959 3 Sheets-Sheet 3

HORACE M. ROBINSON
INVENTOR.

BY Flam and Flam
ATTORNEYS.

United States Patent Office 3,045,166
Patented July 17, 1962

3,045,166
MOTOR-BRAKE UNIT
Horace M. Robinson, 3927 Collis Ave.,
Los Angeles, Calif.
Filed Oct. 2, 1959, Ser. No. 844,613
9 Claims. (Cl. 318—367)

This invention relates to electrically operated brakes for alternating current motors.

Electromagnetic combined motor-brake structures are commonly used for various applications. Brakes are customarily designed such that they are normally applied to prevent rotation of a load shaft in the absence of energization of the motor. This provides a "fail-safe" operation. In usual applications, an electromagnetic brake is energized to release the load shaft upon or immediately after energization of the motor circuit. This is effected by supplying the brake electromagnet and the motor in parallel from a common source.

For purposes of safety, however, the brakes are to be energized only if the motor is energized, and the brake is precluded from being energized if a motor winding is open-circuited for any reason. The load cannot then be dropped, for example. A series circuit relationship between the brake and the motor satisfies the foregoing criterion. But unfortunately, the electromagnetic brake structure introduces excessive reactance into the motor circuit, and the performance of the motor suffers. Optionally, power relay circuits may be provided for energization in series dependency with the motor. But the provision of added equipment is not desirable from the standpoint of weight, space and maintenance.

The result has been the parallel circuit relationship. This has heretofore been the only practical arrangement when use of a brake is desired. In fact, D.C. brakes would be the more desirable since chattering is avoided and efficient use is made of the iron.

The primary object of this invention is to provide an improved series circuit for an alternating current motor and a direct current brake which overcomes the foregoing disadvantages. This object is made possible by a novel use of rectifier structures, particularly in association with three-phase windings of the alternating current motor.

This invention possesses many other advantages, and has other objects which may be made more clearly apparent from a consideration of several embodiments of the invention. For this purpose, there are shown a few forms in the drawings and forming part of the present specification. These forms will now be described in detail, illustrating the general principles of the invention; but it is to be understood that this detailed description is not to be taken in a limiting sense, since the scope of the invention is best defined by the appended claims. This application is a continuation-in-part of my prior application Ser. No. 799,878, now abandoned, filed March 17, 1959, and entitled Motor-Brake Unit.

Referring to the drawings.

Figure 1:
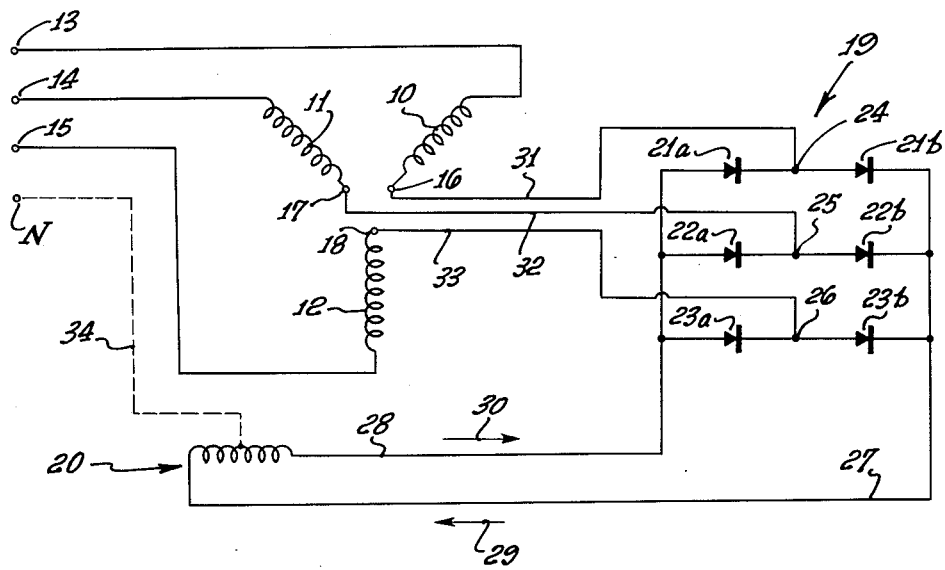
FIGURE 1 is a diagrammatic view illustrating circuits for a brake-motor unit.

In FIG. 1, there is illustrated diagrammatically three phase windings 10, 11 and 12 of a three-phase alternating current motor. One end of each of the windings 10, 11 and 12 is connected to a corresponding power terminal 13, 14 or 15. The other ends of the windings 10, 11 and 12 and at terminals 16, 17 and 18, instead of being connected together in customary star fashion, are connected together by means of a D.C. brake coil 20, a rectifier bridge 19 serving to reflect the D.C. load into the A.C. circuit.

The rectifier structure includes three sets of rectifiers or unidirectionally conductive devices 21a—21b, 22a—22b, 23a—23b, the rectifiers of each set being connected together at terminals 24, 25 and 26 so that alternate conduction paths relative to the terminals are established, and depending upon the relative polarity of the corresponding terminal. The outer terminals of corresponding rectifiers 21b, 22b and 23b are connected together and by a lead 27 to one side of the brake coil 20. The corresponding outer terminals of the other rectifiers 21a, 22a and 23a are connected together and by a lead 28 to the other side of the brake coil 20. The rectifiers are correspondingly disposed so that current in the leads 27 and 28 flows only in the direction of the arrows 29 and 30.

The terminals 24, 25 and 26 are connected by leads 31, 32 and 33 to the respective winding terminals 16, 17 and 18.

When the current is maximum positive to the motor winding 10, current will flow to the brake winding via the terminal 16, lead 31, terminal 24, rectifier 21b to the lead 27, brake winding 20 and to the lead 28. At this point, the current will divide through the rectifiers 22a and 23a to the other windings 11 and 12 of the motor and to the respective terminals 14 and 15.

As the cycle continues, other distributions take place as between the rectifiers 21a—21b, 22a—22b, 23a—23b.

It is noted that the transition of currents between the various rectifiers is smooth; that is, no abrupt commutating action takes place as might be expected. The rectifiers conduct throughout a full 180° rather than 120°. The apparent reason for this is that the voltage drop across the brake winding 20 is small in comparison to the inductive drop across the several motor windings 10, 11, and 12. It was found that smooth transition occurs when the voltage drop across the brake does not exceed substantially five percent of the voltage drop across any one of the motor windings 10, 11 or 12. Since true full-wave commutating action takes place, the wave form of current through the motor windings 10, 11 and 12 remains substantially sinusoidal, and appropriate motor operation is achieved; yet, at the same time, the brake 20 is dependent upon the windings of the motor being operative.

Magnetic circuits associated with the brake winding 20 can be so adjusted that the current through the brake winding 20 will be ineffective to release the motor shaft in the event that any one or more of the motor windings is open.

A neutral connection can be established, if desired, from the midpoint of the coil 20, as by a lead 34, to a neutral terminal N.

Figure 2:
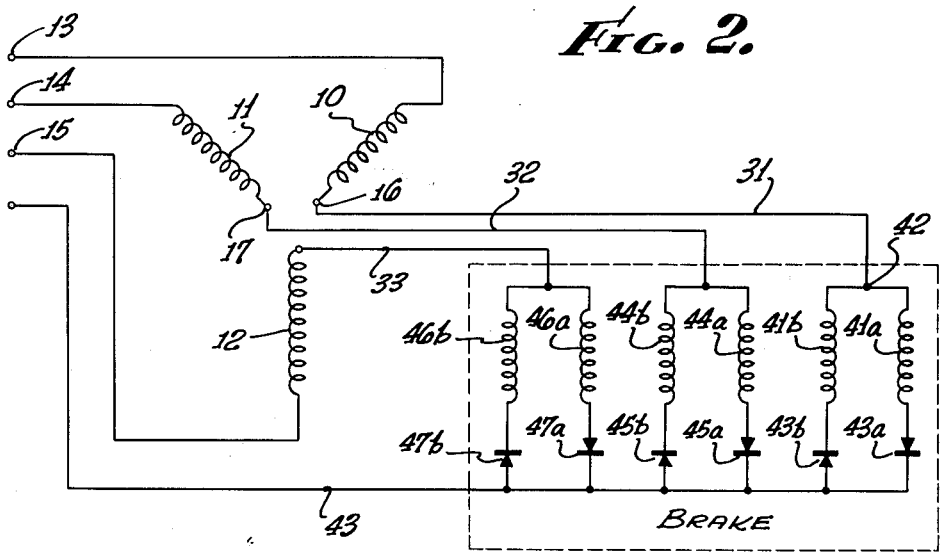
FIG. 2 is a diagrammatic view similar to FIG. 1 but illustrating an alternate arrangement utilizing D.C. brake coil sections whereby either mesh or star connections can be made.

In the form illustrated in FIG. 2, the neutral connection is available for other equipment.

In this example, the brake winding comprises a series of coil sections wound upon a common core. Pairs of coil sections separately connect with the respective phase windings of the motor. Associated with the winding 10 and the lead 31 is a pair of brake winding sections 41a and 41b connected together at a terminal 42 to which the lead 31 connects. The other ends of the windings 41a and 41b both connect to a neutral lead 43, but through alternately conductive rectifiers 43a and 43b. Similarly, coil sections 44a and 44b and rectifiers 45a and 45b are provided for the lead 32 for phase winding 11. Coil sections 46a and 46b and rectifiers 47a and 47b are provided for the lead 33 and phase winding 12.

Operation of the motor is virtually identical to that described in FIG. 1. Rectifiers 43, 45 and 47 conduct through a full 180°, and little or no wave form distortion occurs. The coils 41a—41b are, by virtue of the connection of the associated rectifiers, alternately operable. For example, current at one instant may flow via lead 31, terminal 42, winding section 41a, rectifier 43a, neutral lead 43, rectifiers 45b and 47b through coil sections 44b and 46b to leads 32 and 33. Similar paths are established at succeeding portions of the cycle.

Figure 3:
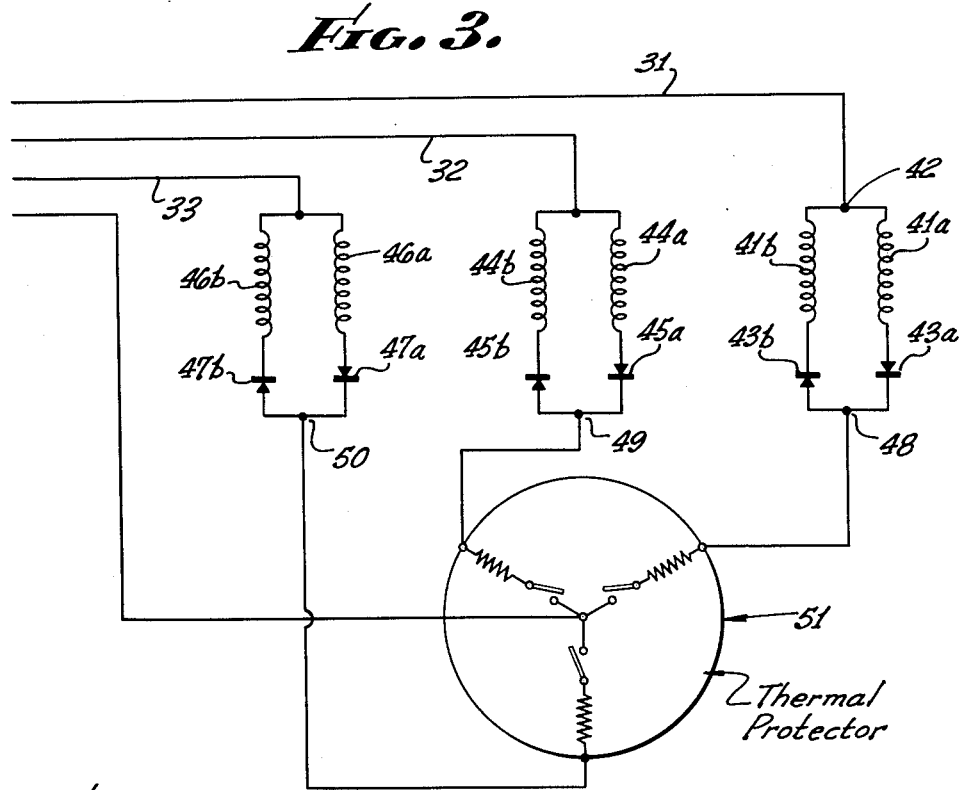
FIG. 3 is a diagrammatic view similar to FIG. 2 but illustrating how the coil units form part of respective star connections so that a conventional thermal protector, for example, may be inserted at the center of the star.
Figure 4:
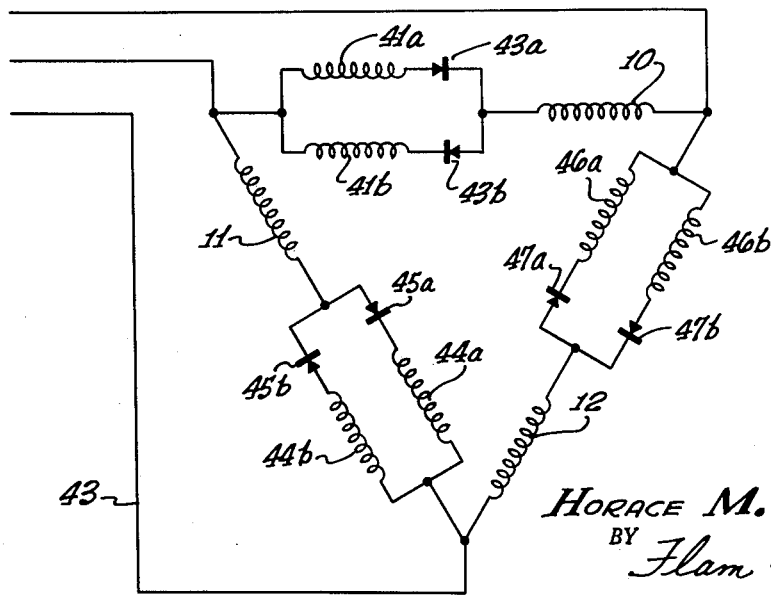
FIG. 4 is a diagrammatic view illustrating how the coil units may be utilized for inclusion in a mesh connection in contrast to a star.

The winding sections 41a, 41b and the rectifiers 43a and 43b form one unit which in essence is serially inserted in the motor phase winding 10. Neutral terminals 48, 49 and 50 can be isolated, as indicated in FIG. 3. So far as the motor operation is concerned, the terminals 48, 49 and 50 are equivalent of the terminals 16, 17 and 18. The terminals 48, 49, 50 can be tied together, as in FIG. 2, or they may be opened. When opened, as in FIG. 3, a standard thermal protector, diagrammatically illustrated at 51, may be accommodated. This device requires a neutral lead and separate phase connections. These requirements are met by the use of the separate winding units described in FIG. 1. Furthermore, the brake winding units make possible usual voltage changeovers by shifting from mesh to star or vice versa. Thus, in FIG. 4, the windings 10, 11 and 12 are now connected in mesh, the unit comprising the windings 41a, 41b, rectifiers 43a and 43b now forming a serial part of the leg associated with the winding 10. Versatility is thus achieved.

Figure 5:
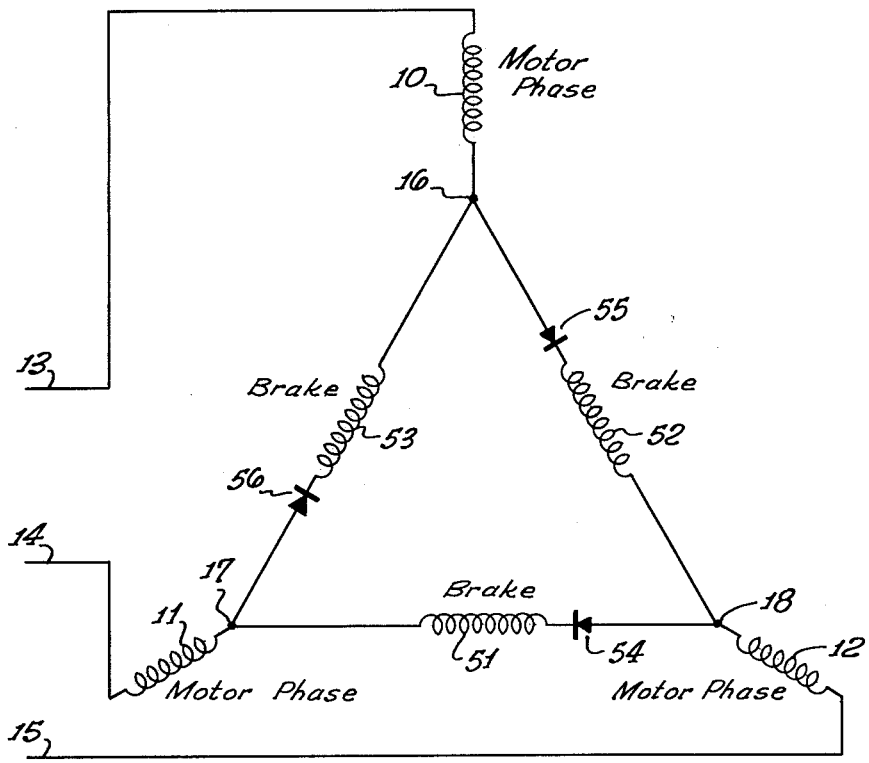
FIG. 5 is a diagrammatic view of still another modified form of the present invention.

In the form illustrated in FIG. 5, three brake coils 51, 52 and 53 are delta-connected together between motor phase windings 16, 17 and 18. In each of the delta branches a rectifier 54, 55 and 56 is inserted. The rectifiers are so polarized that current is constrained to flow in one and only one direction about the loop, in this instance in a clockwise direction.

It will be appreciated that the brake circuit or loop permits the desired flow of current in the motor phase windings 10, 11 and 12. However, as current flows between the motor phase windings 10 and 11, for example, a clockwise path must always be taken. Thus if the lead 13 is more positive than the lead 14, current between the motor phase windings 10 and 11 will flow through the brake coils 52 and 51. Reciprocally, if the lead 14 is more positive than the lead 13, the current between the motor phase windings 10 and 11 will flow via the brake coil 53. In both cases, a counterclockwise current direction results in the brake circuit.

If the brake coils 51, 52 and 53 have equivalent electrical characteristics, obviously the impedance to the flow of current from the lead 13 to the lead 14 is more than from the lead 14 to the lead 13 because the two brake coils are operative in the former case and only one in the latter. This asymmetry results in a direct current component of current at the motor leads 13, 14 and 15, although it is quite slight. Some even harmonics may be accordingly induced in the event of transforming usages. In most cases, however, the disadvantages encountered by the use of the circuit described will be far outweighed by the substantial saving in equipment. In this case, as in the former embodiments, the desired interdependency of brake coils and motor windings is achieved while direct current operation of each of the brake coils results.

The inventor claims:

1. In combination: a motor having polyphase armature windings; an electromagnetic brake operatively associated with the motor and having an operating winding which, when energized, releases the brake; terminals for connection to a source of alternating current; undirectionally conductive means connecting the armature windings and the brake winding across the terminals to establish a serial relationship therebetween with respect to said terminals.

2. In a circuit for a motor-brake unit: a plurality of phase windings for an electric motor, and having first and second terminals, corresponding first terminals being cooperable with a plural phase source; a plurality of sets of unidirectionally conductive devices, the devices of each set being serially connected for current flow in one direction relative thereto; a plurality of leads for the phase windings respectively, each connected to the second terminal of the corresponding phase winding and to a point between serially connected devices of one of the sets of devices; and means for connecting the remote ends of the serially connected devices together, including coil means for a D.C. brake.

3. In a circuit for a motor-brake unit: a plurality of phase windings for an electric motor, and having first and second terminals, corresponding first terminals being cooperable with a plural phase source; a plurality of sets of unidirectionally conductive devices, each of the sets including a terminal to which both devices of the set, but in opposite conductive orientation, connect; means connecting said terminals respectively to the second terminals of said phase windings; remote ends of correspondingly oriented devices being connected together to form a power supply for a D.C. load; and a brake coil connected across the power supply provided by said connected devices.

4. The combination as set forth in claim 3 in which the coil is so designed that the voltage drop across said coil is of the order of 5% of the voltage drop across any of said phase windings.

5. In a circuit for a motor-brake unit or the like: a plurality of brake sections, each comprising means forming a pair of terminals; a pair of parallel circuit branches between the terminals, each serially including a brake coil and a unidirectionally conductive device, the devices of the respective branches being oppositely disposed to permit conduction in opposite directions between the terminals; and motor phase windings serially associated with the respective units.

6. In a circuit for a motor-brake unit; a plurality of phase windings for an electric motor, and having first and second terminals, corresponding first terminals being cooperable with a plural phase source; a plurality of sets of unidirectionally conductive devices, each of the sets including a pair of coil sections and a pair of devices connected together at a terminal so that two branches are provided, each of which includes a coil section, the devices being oriented in opposite conductive relationship relative to said terminal; means connecting said terminals to said second terminals of said phase windings; ends of the branches being connected together to form a neutral or mesh network.

7. In combination: a motor having a polyphase winding, corresponding first terminals of which are cooperable with the plural phase source; a circuit mesh having branches corresponding in number to the phases of the motor winding, each leg of the mesh including a brake coil and a unidirectionally conductive device serially connected thereto, the devices of the several mesh legs being so oriented as to permit a circulation of current in one direction about the loop; and means connecting the junctions of the legs of the mesh to the other corresponding terminals of the polyphase armature windings respectively.

8. In combination: a motor having an armature winding; unidirectionally conductive means; a brake having a winding; means serially connecting the armature winding, the brake winding and the unidirectionally conductive means so that direct current components of the alternating current passing through the armature winding pass through at least portions of the brake winding; the motor and the brake being operatively associated; the brake winding when energized releasing the brake.

9. In combination: a motor having an armature winding; means forming terminals for connection to a source of alternating current; a brake having winding; and unidirectionally conductive means connecting the armature winding, and the brake winding to establish a serial relationship of said armature and brake windings with respect to the terminals; the motor and the brake being operatively associated; the brake winding when energized, releasing the brake.

References Cited in the file of this patent
UNITED STATES PATENTS
2,117,839    Chubb _____ May 17, 1939